(12) United States Patent  (10) Patent No.: US 7,912,256 B2
Russo  (45) Date of Patent: *Mar. 22, 2011

(54) SECURE SYSTEM AND METHOD OF CREATING AND PROCESSING PARTIAL FINGER IMAGES

(75) Inventor: Anthony P. Russo, New York, NY (US)

(73) Assignee: Authentec, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/499,024

(22) Filed: Jul. 7, 2009

(65) Prior Publication Data

US 2009/0324028 A1 Dec. 31, 2009

Related U.S. Application Data

(62) Division of application No. 10/947,040, filed on Sep. 21, 2004, now Pat. No. 7,574,022.

(60) Provisional application No. 60/573,368, filed on May 20, 2004.

(51) Int. Cl.
  *G06K 9/00* (2006.01)

(52) U.S. Cl. ............................................. 382/124
(58) Field of Classification Search .......... 382/124–125, 382/209; 283/68
  See application file for complete search history.

(56) References Cited

U.S. PATENT DOCUMENTS

| 6,546,122 B1 | 4/2003 | Russo ........................ 382/125 |
| 7,194,116 B2 | 3/2007 | Du et al. ..................... 382/124 |
| 7,236,617 B1 | 6/2007 | Yau et al. .................... 382/125 |
| 2003/0123715 A1 | 7/2003 | Uchida ....................... 382/124 |
| 2004/0114784 A1 | 6/2004 | Fuji ............................. 382/124 |

FOREIGN PATENT DOCUMENTS

WO 01/80167 10/2001

*Primary Examiner* — Daniel G Mariam
(74) *Attorney, Agent, or Firm* — Allen, Dyer, Doppelt, Milbrath & Gilchrist, P.A. Attorneys at Law (57) ABSTRACT

Apparatus, system, method, computer program, and computer program product that provide a security in creating and processing fingerprint images obtained from a fingerprint sensor by generating a full image fingerprint minutia feature template without ever generating or reconstructing the full or complete fingerprint image that is conventionally required to generate such minutia feature template.

20 Claims, 3 Drawing Sheets

SECURE SYSTEM AND METHOD OF CREATING AND PROCESSING PARTIAL FINGER IMAGES

CROSS REFERENCE TO RELATED APPLICATIONS

This application is a divisional of U.S. patent application Ser. No. 10/947,040, filed Sep. 21, 2004, which is a related to and claims the benefit of priority under 35 U.S.C. 119 to U.S. Provisional Patent Application Ser. No. 60/573,368 filed 20 May 2004 entitled Secure System And Method Of Creating And Processing Partial Finger Images; and U.S. patent application Ser. No. 10/194,994 filed 12 Jul. 2002 entitled Method and System for Biometric Image Assembly From Multiple Partial Biometric Frame Scans is a related patent application; each of which application is hereby incorporated by reference herein.

BACKGROUND OF THE INVENTION

There are currently many finger image sensors available from various vendors. For example, various fingerprint sensors and systems (including fingerprint swipe sensors, fingerprint placement sensors, and fingerprint sensors of other types) are described in U.S. Pat. Nos. 6,459,804, 6,289,114, 5,177,802, 4,933,976, and 4,429,413, which patents are hereby incorporated by reference. Other fingerprint sensors, systems, and methods are described in co-pending United States patent applications assigned to Atrua Technologies, Inc. 1696 Dell Avenue, Campbell, Calif. 95008, including in U.S. patent application Ser. No. 10/099,558 entitled Fingerprint Biometric Capture Device and Method with Integrated On-Chip Data Buffering and published as US 2003/0021495 A1; and U.S. patent application Ser. No. 10/134,042 entitled Capacitance Sensor System with Improved Capacitance Measuring Sensitivity and published as US 2003/0016849 A1.

Regardless of the specific fingerprint sensing technology used, there are two broad categories of fingerprint sensors: placement sensors and swipe sensors. Placement sensors are large enough to image a finger (or pertinent portion of the finger containing the fingerprint) simply by placing the tip of the finger on the sensing surface and acquiring the data in a single step. Swipe sensors, on the other hand, are too small to capture an entire fingerprint image with a single sensor field of view or acquisition step. Instead, users must move (or swipe) their finger across the smaller sensor while it captures multiple frames of data, each frame containing a portion of the full or complete fingerprint image. The individual image frames are "reconstructed" into a complete fingerprint image so that they can be processed with conventional feature extraction and matching algorithms. One such method of reconstruction is given in U.S. patent application Ser. No. 10/194,994 filed 12 Jul. 2002 by inventor Anthony P. Russo and entitled Method And System For Biometric Image Assembly From Multiple Partial Biometric Frame Scans and published as US 20030126448A1, which is hereby incorporated by reference. Some examples of feature extraction methods are given in references, such as for example in U.S. Pat. No. 6,681,034B1, U.S. Pat. No. 6,668,072B1, U.S. Pat. No. 6,480,617B2, U.S. Pat. No. 6,041,133, U.S. Pat. No. 5,613,014, U.S. Pat. No. 5,420,937, and U.S. Pat. No. 5,109,428 as well as the documents referenced in the references cited section of these patents. The result of feature extraction is called the fingerprint "template" and contains all the distilled information from the original image that is required to match that fingerprint to previously enrolled templates.

As stated above, in the current state of the art, a full or complete image of the fingerprint is typically reconstructed using a set of smaller image frames obtained from a swipe sensor type fingerprint device. However, there are reasons why creating a complete image of the fingerprint prior to the feature extraction step is undesirable.

Security is one of the most compelling reasons for not generating or storing a complete fingerprint image: if a complete fingerprint image never exists in memory or is never otherwise stored as a full image or data set, it cannot be stolen by hackers or used by others in possession of the device carrying the sensor to impersonate the person to whom the fingerprint belongs. Note that in some security systems there is a desirability to have the person physically present at the time the fingerprint image is acquired and therefore permitting a full or complete fingerprint image to be constructed, also offers an opportunity for the constructed full or complete fingerprint image or corresponding data set representing the fingerprint image to be stored and misused. Such complete fingerprint image may even occur unintentionally, such as in the event that the computing system carrying the fingerprint sensor hangs and retains a copy of the sensed fingerprint image independent of intended operation, or in the event that spy ware, or other hacker or malicious code has been introduced into the computer and attempts to detect the presence of a fingerprint image file or data set and capture it. These are only examples, and those workers in the art will appreciate that there are many other scenarios for accidental or intentional misuse of complete fingerprint images.

Swipe sensors are also more attractive than placement sensors for integration into mobile computing and communication devices such as mobile and cellular phones, personal data assistants (PDAs), and other embedded systems because they are smaller. The smaller size reduces cost as well as power consumption, both of which are more significant issues on embedded devices than on a more expensive personal computer (PC) platform. The smaller size also reduces the surface area needed to present the sensor to the user so that it can be used for other purposes and the smaller exposed area also reduces the potential for damage to the sensor.

Computing efficiency is also an important consideration for embedded devices and reduction of computation and/or computational overhead while still maintaining required security is an ever increasing need.

SUMMARY OF THE INVENTION

The invention provides a secure way of creating and processing fingerprint images obtained from a swipe fingerprint sensor that never reconstructs a full or complete fingerprint image and generates a full fingerprint minutia template that can be used for comparing, matching or showing a mismatch, or in other ways validating or invalidating the identity of a person attempting to access a biometrically secured device, facility, or transaction.

In one aspect, the invention provides a method of forming a complete fingerprint feature template for a finger without first reconstructing a complete image of the finger or fingerprint, the method including: generating separate substantially spatially complementary gapped and fill image data sets storing fingerprint image data that would in combination provide fingerprint image data sufficient to form a complete fingerprint image; augmenting a spatially adjacent region of the gapped image and the fill image to form a substantially spatially continuous augmented image data set; extracting fingerprint features from the augmented image data set and destroying the augmented image data set, and the spatially adjacent region of the gapped image and the fill image that formed the augmented image after the extracting; repeating the augmenting, and extracting and destroying until all of the gapped and fill image data sets have had fingerprint features extracted; and combining the separately extracted fingerprint features to form a complete fingerprint feature template that enables the fingerprint to me compared with and where the comparison is within predetermined criteria to be matched with a reference fingerprint template.

In another aspect, the invention provides a method for maintaining the security of a fingerprint acquired with a fingerprint sensor, the method characterized in that: the acquired fingerprint image is separated during acquisition into at least complementary first and second separate data structures so that no complete fingerprint image data set is ever stored in any one data structure; and a fingerprint feature template is generated representing a complete fingerprint using feature extraction, on a partial image reconstruction and extraction by partial image reconstruction and extraction basis, from less than all of the first and second separate data structures.

In another aspect, the invention provides a system and apparatus for forming a complete fingerprint feature template for a finger without first reconstructing a complete image of the finger or fingerprint, the system including: a processor for performing logic operations on a fingerprint data set; a memory store coupled with the processor and defining separate first and second data structures for storing first and second substantially complementary gapped and fill portions of a fingerprint image as it is received as a data stream from an external fingerprint swipe sensor; image augmentation logic augmenting a spatially adjacent region of the gapped image and the fill image to form a substantially spatially continuous augmented image data set; feature extraction logic extracting fingerprint features from the augmented image data set and destroying the augmented image data set, and the spatially adjacent region of the gapped image and the fill image that formed the augmented image after the extracting; and partial template combining logic for combining the separately extracted fingerprint features to form a complete fingerprint feature template.

In another aspect, the invention provides a computer program and computer program product for performing the inventive method within a processor and memory. In still another aspect, the invention provides a secure data structure for maintaining separation of portions of a single finger print image to enhance the security of the fingerprint during acquisition and processing.

BRIEF DESCRIPTION OF THE DRAWINGS

FIG. 1b is a schematic diagram illustrating another portion of the method steps of generating a minutia template in accordance with the embodiment in FIG. 1a.

DETAILED DESCRIPTION OF EMBODIMENTS OF THE INVENTION

The invention provides a more secure way of creating and processing finger images or fingerprint images obtained from a "swipe" fingerprint sensor than has previously been available. The present invention is novel and differs from conventional system and methods at least because it never has the fully reconstructed image or dataset representing the image of the complete finger or fingerprint in memory at any one time, which is desirable from both security and computing standpoints. While encrypting parts or all of the reconstructed image might be an alternative and viable approach that addresses the security issue, this inventive structure and method is simpler than an encryption approach and costs very little additional computational effort to carry out. Encryption may be applied in addition to provide even greater security or where encryption is mandated by regulation or according to some standard.

Unlike conventional systems and methods that reconstruct a full or complete image of the fingerprint using a set of smaller images obtained from the swipe sensor device, the invention uses a novel approach that can extract all the important information that would conventionally require the generation of a full or complete fingerprint image, without ever generating or having that complete fingerprint image stored or resident in memory at any time. By not having the image in memory at any time, it provides a more secure method of gathering and processing the information, since a malicious hacker cannot obtain a useful fingerprint image by viewing the memory contents of the host computing platform that executes the processing.

The inventive system and method also advantageously reduce or minimize computational overhead while still achieving security goals.

Figure 1A:
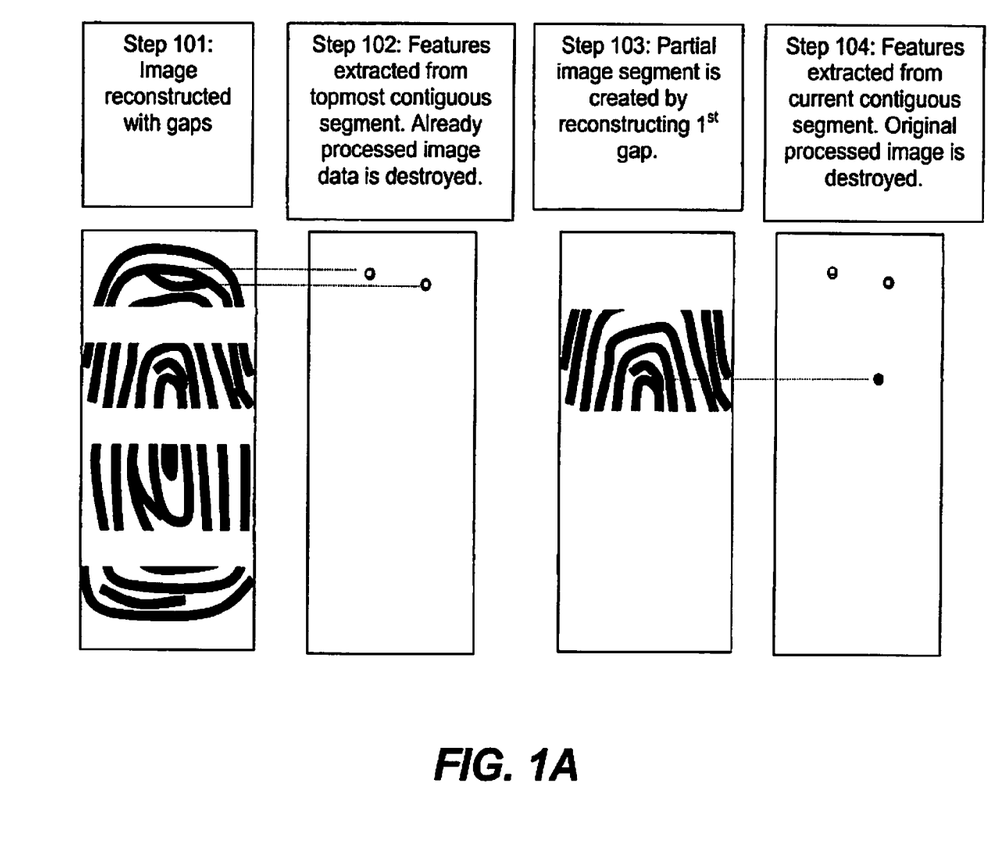
FIG. 1a is a schematic diagram illustrating a portion of the method steps of generating a minutia template in accordance with an embodiment of the present invention.
Figure 1B:
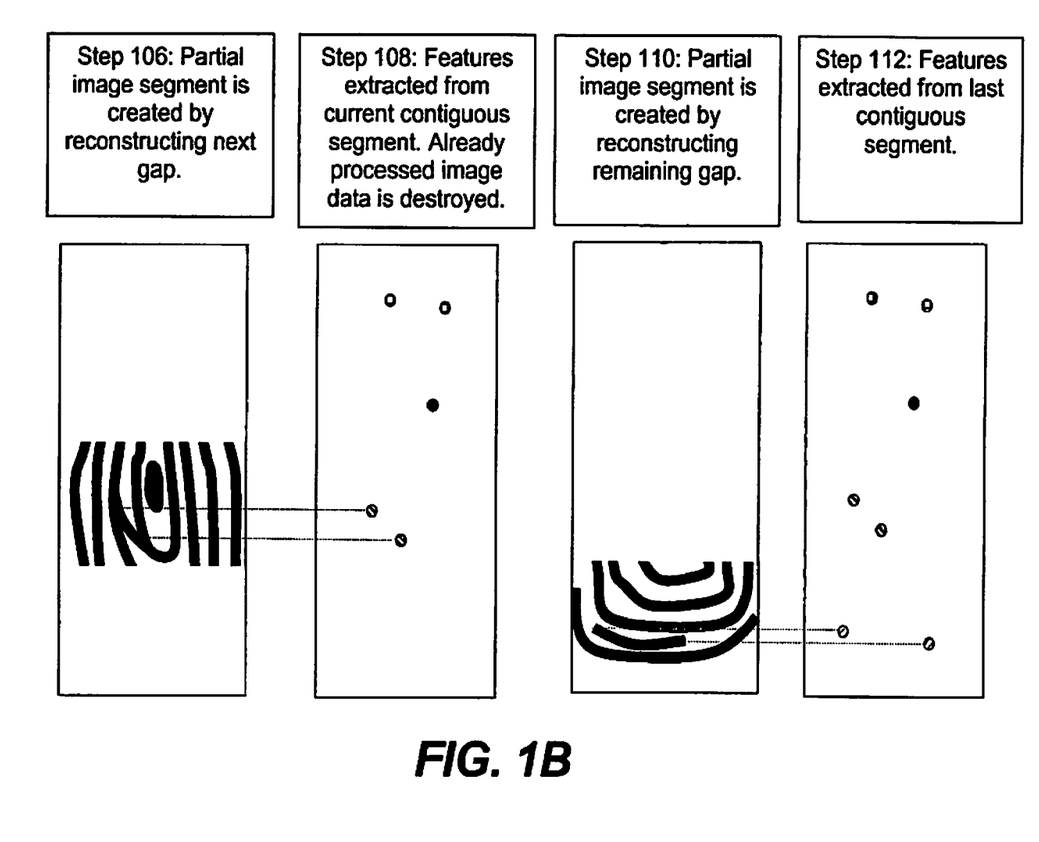

An embodiment of the inventive method is outlined in FIG. 1, which shows some stages during the acquisition of partial fingerprint images (or data sets) and the minutiae feature extraction from these partial images. During Step 101, all of the raw sensor frames are captured. This capture may be accomplished according to any of a variety of know techniques for operating either a placement sensor or a swipe sensor, such as for example as described in U.S. patent application Ser. No. 10/194,994 and published as US 2003/0126448 A1, herein incorporated by reference. In some embodiments, the capture may be divided into separate frame acquisition events so that the same process never sees the complete fingerprint image, even though to the user it may appear to be a single acquisition event where the user continuously swipes his/her finger over the sensor. In another embodiment, two or more separate swipes may be used to acquire the fingerprint data but this is disadvantageous because of the inconvenience to the user and the possible additional computational burden associated with using parts of two separate fingerprint scans.

Once the raw sensor frames have been captured or acquired, however, instead of reconstructing the image in its entirety as is conventionally done, intentional gaps are left in the reconstructed image. The gaps are created by not reconstructing the image in certain areas, and optionally by inserting blank space into the reconstructed image instead of the actual frame data or by placing some other marker or indicator in the image or external to the image to indicate the gap or discontinuity. The acquired frame data for which the blank space is substituted is saved into a different buffer and not reconstructed, so the acquired but uninserted frame data is useless by itself.

For each saved frame, we also save the computed place (x and y or row and column coordinates) where it should conventionally have been inserted into the reconstructed image had intentional gaps not been created or inserted. Any number of gaps of any size are possible and may be implemented, but in one embodiment of the invention to save memory and still achieve good performance we choose two gaps about 20 rows high, enough to make fingerprint matching difficult if not impossible if this were all the information or data that was used for the matching. Other embodiments having a single gap, or having two, three, four, five, six, seven, eight, nine, ten, or more gaps may be implemented.

The number of gaps may be selected according to various factors, such as the degree of security required, the likelihood that a portion may be sufficient to support some fraudulent activity, and the assessed computational burden associated with the number of gaps. The number and size of gaps may be programmable. In one embodiment, the number and size of gaps are intentionally varied for each acquisition according to some rules, policies, or algorithms to reduce an intruder's ability to obtain usable partial or complete fingerprint images increase security. In another embodiment, the number of gaps is selected by assessing the computational power and/or memory capabilities of the computing device with which the fingerprint sensor and acquisition system is operating to provide a secure yet optimized or near-optimized configuration.

One goal of the invention is not to generate or store together any single partial fingerprint image reconstruction that would be sufficient to match with another fingerprint image and therefore create a security risk. Another goal being to reduce the memory consumed at any given time for the processing, especially in so called thin computing platforms having relatively small memory and processor capabilities. By comparison, a typical full or complete reconstruction of a fingerprint image uses much more memory.

During Step 102, all of the data from the top of the image to the first gap is processed through a standard minutiae extraction step (or other template creation processing), which finds all of the minutiae in that image segment. This is the initial template. At this point the original image data segment (that is the data from the top of the image to the first gap) can be destroyed for security reasons and/or to reclaim memory.

Feature extraction methods are known in the art and are not described in detail here other than by way of citation to certain papers and references. Some examples of feature extraction methods are given in references, such as for example in U.S. Pat. No. 6,681,034B1, U.S. Pat. No. 6,668,072B1, U.S. Pat. No. 6,480,617B2, U.S. Pat. No. 6,041,133, U.S. Pat. No. 5,613,014, U.S. Pat. No. 5,420,937, and U.S. Pat. No. 5,109,428 as well as the documents referenced in the references cited section of these patents. The result of feature extraction is called the fingerprint "template" and contains all the distilled information from the original image that is required to match that fingerprint to previously enrolled templates.

During Step 103, the top-most remaining gap is "filled in" by pasting the saved frames for that gap into the image at the saved locations (i.e., the gap is now reconstructed).

In Step 104, the image segment from the top of the reconstructed gap to the start of the next gap below it is processed to extract minutiae and/or other features. The newly found minutiae (or other desired fingerprint features) are added to the template created in the previous step to form a larger template that includes all of the information available in the image up to the start of the next gap. Again, the processed image data can then be destroyed and the memory that would have been consumed in storing it can be freed and made available for other processes.

The above Steps 103 and 104 are repeated until all gaps are filled in and all image data has been processed. At the end of the processing, all of the minutiae and other features have been extracted into the template. That is, the final template contains all of the features that would have been available in a full or complete reconstructed fingerprint image, even though no full or complete reconstructed fingerprint image never existed.

Features of the inventive procedure according to one embodiment are now highlighted. First, an image is reconstructed with gaps (Step 101). Next, features are extracted from topmost contiguous segment and the already processed image data is destroyed (Step 102). Then, a partial image segment is created by reconstructing the first gap (Step 103), and features are extracted from current contiguous segment followed by destruction or deletion of the original processed image (Step 104). This process is repeated for any other partial image segments. For example, in the illustration, a partial image segment is created by reconstructing the next gap (Step 106), and features are extracted from the now current contiguous segment and then the already processed image data is destroyed (Step 108). A next partial image segment is created by reconstructing the remaining gap (Step 110), and features are extracted from the last contiguous segment and then the already processed image data for this segment is destroyed (Step 112).

In one particular embodiment, the extraction step advantageously but optionally takes into account the special processing necessary to detect features on the border between partial segments, and is sophisticated enough to correctly detect minutiae that could otherwise only be detected when two adjoining partial segments are available. That is, there are cases where just having one partial segment would not be enough to detect minutiae in that partial segment, because more context is needed, and that context is only available in the next adjoining segment. In one embodiment, it does this by saving enough current state information (but not sensor pixel information) to smoothly continue on when new segments are processed. In another embodiment, a small amount of sensor pixel information or data is retained from each scan near the gap to that these adjacent areas may be specially processed. The data retained is selected so that it is not sufficient by itself to reduce overall security or any specifically identified security risk. In general, creating even one gap of sufficient size or a few gaps for a typical fingerprint will provide a useful level or security, while providing several gaps of sufficient size will virtually assure that there will be insufficient minutiae or fingerprint area coverage to permit a useful fingerprint comparison and identification match.

Either, both, or all of the number of gaps, the gap height (or length in a direction of relative finger-tip to sensor motion), and the gap width (described further below) may be varied. In one embodiment, two gaps, each twenty rows high (in length) are used, but those workers having ordinary skill in the art in conjunction with the description provided here will appreciate that this is not the only combination of gaps number and gaps size that may be used.

In some embodiments there is a relationship between the number of gaps and the height of each gap. The number of gaps times the height of each gap is advantageously less than the total height of what would be the reconstructed image (if the image were actually reconstructed). For example, for a typical four-hundred row image, there would advantageously be no more than twenty gaps where each gap is less than ten rows high, and this would correspond to a situation where one-half the image is gaps.

It is desirable to reduce the number of gaps and the length of the gaps that are created at least because in one embodiment that stores raw scanner frames, gaps are expensive to store because of the amount of raw scan date involved. In simplistic terms, then one does not want to store too many gaps, so long as the number of gaps permits achieving the desired degree of security. Embodiments of the invention have utilized as few as two rows and a practical maximum of about one-hundred rows for a typical four-hundred row image equivalent. Any number of rows between the two-row and four-hundred row gap number may be utilized. These numbers are only guidelines and the system and method do not impose any actual maximum number of rows. Gap length should advantageously also fall within a range. If a small number of rows are used (too few rows) then the gaps may not be large enough and be ineffective at preventing a match using the image with gaps. If the gaps are too large, they will be effective at preventing a match, but will consume too much memory or buffer space to store the raw scanner frames.

In one embodiment, the amount of memory needed to store a gap is reduced by generating gaps that do not extend for the entire width of a frame but only extend for a fraction of less than the full frame width, and have some of the characteristics of holes described elsewhere in this description. In other words, while embodiment of the inventive system and method used a gap width that is equal to the frame width, other embodiments use gap widths of less than the frame width. While there are no absolute limits on the gap width, it will be appreciated that a practical gap width range is from about ten columns up to the full frame width. Again, if the gap width is too small it will not prevent matching to the extent desired for security. Longer gap widths impose larger storage requirements as described. Gap with, gap length, and the number of gaps may be selected to optimize the combination of security benefit (by preventing matching of a gapped image), storage requirements, and computational loading.

Particular embodiments of the invention may used gap widths of from about ten-percent of the frame width to one-hundred percent of the frame width, such as for example 10%, 20%, 30%, 40%, 50%, 60%, 70%, 80%, 90%, 100% or any value between these.

In another alternative embodiment, the gaps are generated or filled with something else besides white (or other constant gray level) pixels or raw frame data. In still another embodiment, the gap data is replaced with nothing, so that discontinuous rows substantially abut each other until the missing reconstructed gap data is inserted back where it belongs. In even still other embodiments, a single row or any other defined number of rows may be introduced to hold the place of the actual sensed rows in the gaps. Therefore in some embodiments there is no need to actually consume memory by storing artificial values for the gap row pixels, instead the system may use knowledge of the location of the gaps in its computations, so that the gap pixels may be actual or virtual. Holes instead of gaps could alternatively be used. According to one embodiment, the use of holes for or within the gaps means that instead of having a rectangular gap of gap height $H_g$ that stretches the full width of the frame from one end of the frame (for example, the far left) to the other end of the frame (e.g. the far right), one reconstructs all or substantially all of the data except the data within a narrower rectangular region or within a plurality of smaller regions, still of gap height $H_g$, but starting at some first coordinate $x1_{start}$ and ending at another coordinate $x1_{end}$. If a plurality N of holes are to be created then there will be a plurality of starting and stopping coordinates along the width of the frame for each hole, such as the pairs $(x1_{start}, x1_{end})$, $(x2_{start}, x2_{end})$, ..., $(xN_{start}, xN_{end})$. In one embodiment, only one hole is used for the gap and starts at one edge of the frame ($x1_{start}=0$) and ends at the other edge of the frame ($x1_{end}=$frame width).

One advantage associated with the use of gap holes is that it saves memory or buffer storage space. For the single gap hole example, only the raw frame data starting at $x1_{start}$ and stopping at $x1_{end}$ needs to be saved. For the multiple gap hole embodiments, only the raw frame data starting and stopping within each gap hole need be stored.

It will be noted that in some of the described embodiments, there is a reconstructed portion and a gap or gapped portion which are stored and such storage may be distributed into different memories or different portions of the same memory to provide a desired level or security. In other embodiments, the finger image data is stored as partially reconstructed image with gaps and raw frame data may be stored in the same or a different memory or portion of a single memory to provide the desired security. Various memory storage strategies may be employed in conjunction with the invention. Advantageously in many of the embodiments of the invention, neither the raw image frame scan or acquisition process nor the subsequent processing of all or part of the raw image frame scans ever stores or reconstructs a full or complete fingerprint image within a single memory where it may represent a security issue. Other embodiments of the invention may provide different memory storage strategies where security concerns are different.

It will be appreciated that one of the objectives is to remove data in any one image that would permit generating all of the minutiae required for fingerprint matching or recognition with another fingerprint reference minutiae template. This objective is in a trade-off with the desire to minimize memory or buffer storage associated with storing raw frame data for the gaps for subsequent processing.

Note that the entire process still results in a properly formed fingerprint template that has the minutiae for the entire finger (or any portion of the finger that is desired if other than the entire finger or fingerprint is to be collected), and the actual matching of the extracted fingerprint template to one that was enrolled earlier can occur at any time when the template contains enough information to perform an accurate match. However, typically there is little or no advantage to doing the match earlier than the creation of the full template, so systems that employ this invention would typically complete all the steps prior to performing any fingerprint match. An embodiment of the invention that may generate only a partial template (such as a template based only on portions of the sensed fingerprint image and does not attempt to fill in the gaps as the template is generated), may alternatively be used, especially when implemented such that security and reliability are not significantly compromised.

While embodiments of the invention are described using a first image having gaps and a second supplementary or fill image containing the portions of the fingerprint image not included in the first gapped image, it will be appreciated in light of the description provided that the fingerprint image data may be acquired, collected, generated, or stored into a plurality of first gapped images and/or as a plurality of supplementary fill images. It will also be appreciated that the gapped image(s) and fill image(s) are different in the portions of the complete image that they store, and that in theory either may be considered to be the gapped or the fill image, and in practice the image storing the normally smaller gap image data sets is the fill image. Depending upon the complete image size and the number and length of gaps, some embodiments may provide that the gapped and fill images have essentially the same characteristics except that they provide complementary fingerprint image data for the complete fingerprint image.

Figure 2:
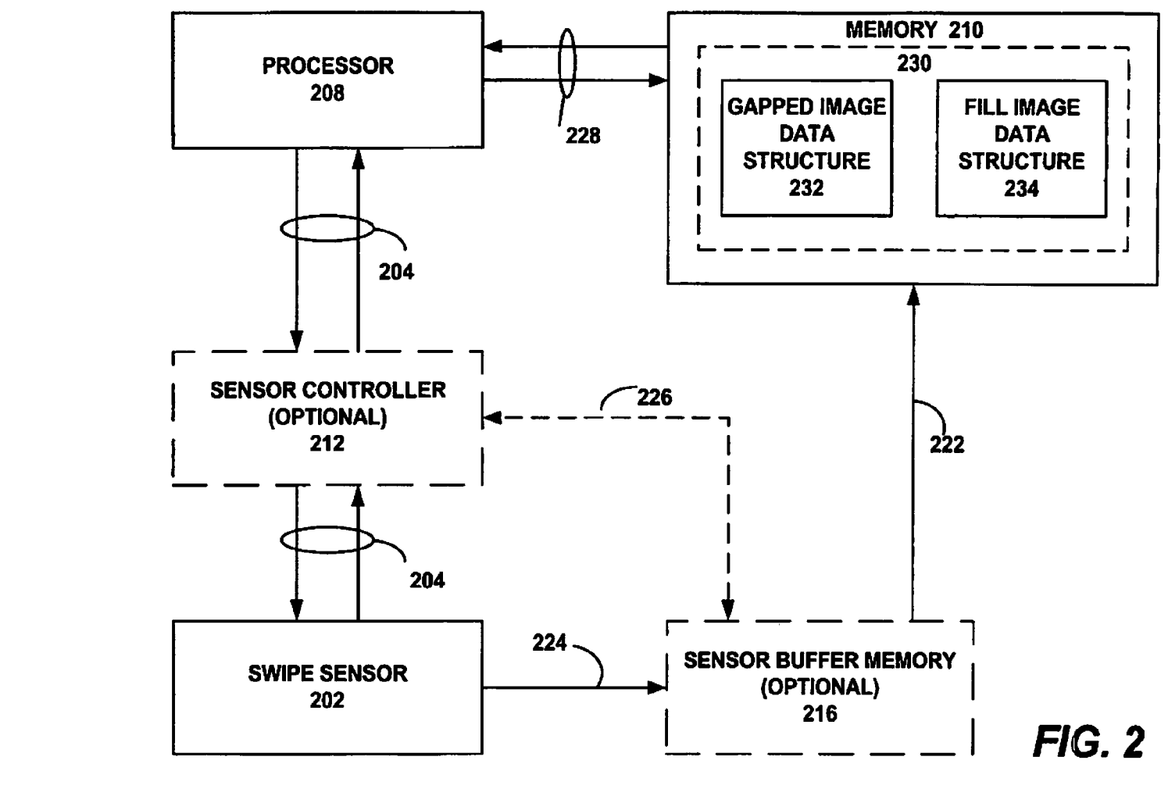
FIG. 2 is an illustration showing an embodiment of a system for generating a minutia template for a fingerprint using a swipe image sensor without ever reconstructing or storing together a full or complete image of the finger or fingerprint.

With reference to FIG. 2 there is illustrated a diagrammatic illustration of a system for generating a minutia template for a fingerprint using a swipe image sensor without ever reconstructing or storing together a full or complete image of the finger or fingerprint.

It will be appreciated that the invention may be utilized in conjunction with a great variety of systems and devices that require or advantageously provide fingerprint-based identification or access to the system or device itself, or to some other system or entity (such as a commercial or financial transaction, contest, or any other event or contract where identification is required or desired) on a remote network server. A placement or swipe fingerprint sensor 202 is coupled for communication via a communication bus or other path 204 with a processor 208 and processor coupled memory (typically a random access memory) 210. The sensor may optionally be coupled to the processor through a separate sensor controller 212. Additional sensor registers or buffers 216 or other forms of sensor memory may be provided to work directly with the sensor 202 and are coupled for communication to the processor and directly or indirectly to the processor memory 210 via busses or other communication paths 222, 224. Where a separate sensor controller 212 and/or sensor buffer memory 216 is not present, the communication may be directly between the sensor 202 (and its associated electronics) and the processor 208 and memory 210 and memory controller rather than through the separate sensor controller and sensor memory 216. The structure and method for operating a conventional swipe sensor within a device are known in the art and not further described here. The processor 208 may be a microprocessor, a processor, a controller, or other logic capable of executing software or firmware instructions such as are normally found in computing devices, notebook computers, cellular telephones, PDAs, music players, and the like. The fingerprint sensor 202 may optionally operate in conjunction with an auxiliary sensor controller 212 so as to reduce the burden on the main processor 202. Architectures and structures for computer systems that operate, use or may be adapted to operate, use, or incorporate fingerprint sensors are known in the art and not described in further detail here. One or more data structure 230 storing input, output, and/or intermediate data may optionally be defined in one or more of the memories for use in accomplishing the inventive method. As described herein, the two complementary image portions (such as the images referred to as the gapped image and the fill image are stored in separate data structures 232, 234 so that no complete image of the finger print is stored in a full or complete form. The separate data structures may be separate files or addressable regions within a common physical or logical memory storage, or within separate physical or logical memory storage. Furthermore, embodiments of the invention may provide that one of the gapped and fill images are stored in memory 210 while the other is stored (or maintained) within the sensor buffer memory 216. In the later embodiment, only the portion of the fill image stored on the sensor buffer memory is communicated to the processor 208 and/or processor memory 210 as needed for augmentation and feature extraction. Specialized software, firmware, and or hardware my optionally be provided to clear memory and buffers so that fingerprint image data is not retained under a variety of normal and aberrant operating conditions.

In embodiments where a placement or other fingerprint sensor is provided that is capable of obtaining a full or complete fingerprint image, the inventive system and method provide additional partial image operation mode logic to operate such placement sensors in a partial image acquisition mode. Such logic may for example be software or firmware executing in the processor, separate controller, or other electronics controlling the acquisition of the image or a memory storing the image. In one embodiment, the inventive method acquires a plurality of partial images over a short period of time (temporally) and stores them separately without ever keeping a full or complete fingerprint image. In another embodiment, the placement sensor is spatially scanned to simulate the swipe sensor acquisition and the partial images obtained are handled in the same manner as swipe sensor acquired partial images (though the need for matching partial images is reduced or eliminated).

While the invention has been primarily described in the context of fingerprint scanned biometric, it will be appreciated that the inventive structure, system, apparatus, and method may also be applied to protecting other image based biometrics, such as but not limited to eye retinal scans.

The inventive method may advantageously provide a computer program and computer program product existing on tangible media. The computer program includes a set of executable instructions to carry out the procedural steps of the inventive method.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A finger sensing apparatus comprising:
    a swipe finger sensor;
    at least one memory; and
    a processor coupled to said swipe finger sensor and said at least one memory for
        obtaining a plurality of image portions of a finger,
        distributing storage of at least first and second image portions while they are being acquired from said swipe finger sensor into respective first and second different data structures in said at least one memory,
        constructing a first partial composite image from the first image portion and extracting features from the first partial composite image to generate a first partial feature template,
        constructing a second partial composite image from the second image portion and extracting features from the second partial composite image to generate a second partial feature template,
        destroying the first partial composite image after extracting features from the first partial composite image and prior to constructing the second partial composite image, and
        combining the first and second partial feature templates to generate a complete combined feature template.

2. The finger sensing apparatus according to claim 1 wherein the at least first and second image portions comprise a plurality thereof.

3. The finger sensing apparatus according to claim 1 wherein the second image portion lies between regions of the first image portion.

4. The finger sensing apparatus according to claim 1 wherein the second image portion corresponds to a portion of the finger adjacent to a region of the first image portion.

5. The finger sensing apparatus according to claim 1 wherein the plurality of image portions each comprises rows of pixels values generated by said swipe finger sensor.

6. The finger sensing apparatus according to claim 1 wherein the at least one memory comprises a single memory.

7. The finger sensing apparatus according to claim 1 wherein the at least one memory comprises a plurality of memories.

8. The finger sensing apparatus according to claim 1 wherein the completed combined feature template comprises a completed combined minutia template.

9. A finger sensing apparatus comprising:
a swipe finger sensor;
at least one memory; and
a processor coupled to said swipe finger sensor and said at least one memory for
obtaining a plurality of image portions of a finger,
distributing storage of at least first and second image portions while they are being acquired from said swipe finger sensor into respective first and second different data structures in said at least one memory,
leaving at least one gap between the first image portion and the second image portion,
constructing a first partial composite image from the first image portion and extracting features from the first partial composite image to generate a first partial feature template,
constructing a second partial composite image from the second image portion and extracting features from the second partial composite image to generate a second partial minutiae template, and
combining the first and second partial feature templates to generate a combined feature template.

10. The finger sensing apparatus according to claim 9 wherein the second image portion lies between regions of the first image portion.

11. The finger sensing apparatus according to claim 9 wherein the second image portion corresponds to a portion of the finger adjacent to a region of the first image portion.

12. The finger sensing apparatus according to claim 9 wherein the plurality of image portions each comprises rows of pixels values generated by said swipe finger sensor.

13. The finger sensing apparatus according to claim 9 wherein the at least one gap comprises a plurality of gaps.

14. The finger sensing apparatus according to claim 9 wherein the at least one memory comprises a single memory.

15. The finger sensing apparatus according to claim 9 wherein the at least one memory comprises a plurality of memories.

16. The finger sensing apparatus according to claim 9 wherein the completed combined feature template comprises a completed combined minutia template.

17. A finger sensing apparatus comprising:
a swipe finger sensor;
at least one memory; and
a processor coupled to said swipe finger sensor and said at least one memory for
separating image data into at least first and second separate data structures so that no complete fingerprint image data set is ever stored in any one data structure of said at least one memory, and
generating a finger feature template on a partial-image-reconstruction-and-extraction by partial-image-reconstruction-and-extraction basis, from less than all of the first and second separate data structures.

18. The finger sensing apparatus according to claim 17 wherein the at least one memory comprises a single memory.

19. The finger sensing apparatus according to claim 17 wherein the at least one memory comprises a plurality of memories.

20. The finger sensing apparatus according to claim 17 wherein the finger feature template comprises a finger minutia template.

* * * * *

UNITED STATES PATENT AND TRADEMARK OFFICE
CERTIFICATE OF CORRECTION

| | | |
|---|---|---|
| PATENT NO. | : 7,912,256 B2 | |
| APPLICATION NO. | : 12/499024 | |
| DATED | : March 22, 2011 | |
| INVENTOR(S) | : Russo | |

It is certified that error appears in the above-identified patent and that said Letters Patent is hereby corrected as shown below:

Column 3, Line 9      Delete: "me"
Insert: --be--

Column 5, Line 17      Delete: "increase"
Insert: --to increase--

Column 6, Line 3      Delete: "never"
Insert: --ever--

Column 6, Line 7      Delete: "from topmost"
Insert: --from the topmost--

Column 6, Line 10      Delete: "from current"
Insert: --from the current--

Column 6, Line 36      Delete: "to"
Insert: --so--

Column 7, Line 27      Delete: "with"
Insert: --width--

Column 7, Line 31      Delete: "used"
Insert: --use--

Column 8, Line 8      Delete: "or"
Insert: --of--

Column 8, Line 9      Delete: "as partially"
Insert: --as a partially--

Signed and Sealed this
Ninth Day of August, 2011

David J. Kappos
*Director of the United States Patent and Trademark Office*

CERTIFICATE OF CORRECTION (continued)
U.S. Pat. No. 7,912,256 B2

Column 9, Line 57   Delete: "my"
　　　　　　　　　　Insert: --may--